US008656361B2

(12) United States Patent
Bragdon et al.

(10) Patent No.: US 8,656,361 B2
(45) Date of Patent: Feb. 18, 2014

(54) DEBUGGING CODE VISUALLY ON A CANVAS

(75) Inventors: Andrew Bragdon, Eastport, ME (US); Kael Rowan, Kenmore, WA (US); Robert Anthony DeLine, Seattle, WA (US); Jens K. Jacobsen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/366,941

(22) Filed: Feb. 6, 2012

(65) Prior Publication Data

US 2013/0205280 A1 Aug. 8, 2013

(51) Int. Cl.
*G06F 9/44* (2006.01)
(52) U.S. Cl.
USPC .......................................................... 717/125
(58) Field of Classification Search
None
See application file for complete search history.

(56) References Cited

U.S. PATENT DOCUMENTS

2004/0250175 A1* 12/2004 Draine et al. .................... 714/46
2010/0146505 A1* 6/2010 Almonte et al. .................. 718/1

OTHER PUBLICATIONS

Bragdon et al., "Code Bubbles: Rethinking the User Interface Paradigm of Integrated Development Environments", May 2-8, 2010, ACM, pp. 455-464.*

Cogswell, Jeff, "Trying Out Microsoft's New Debugger Canvas", Retrieved on: Oct. 11, 2011, Available at: http://www.daniweb.com/software-development/csharp/reviews/370614.
Shenoy, Roopesh, "Debugger Canvas Brings Code Bubbles to Visual Studio", Retrieved on: Oct. 10, 2011, Available at: http://www.infoq.com/news/2011/06/debugger-canvas.
Bragdon, et al., "A Research Demonstration of Code Bubbles", In Proceedings of the 32nd ACM/IEEE International Conference on Software Engineering, vol. 2, 2010, pp. 293-296.
"1st JavaScript Editor Pro 3.6", Retrieved on: Oct. 11, 2011, Available at: http://www.sharewareconnection.com/1st-javascript-editor-pro-3-6.htm.
"Xcode 4 Transition Guide", Retrieved on: Oct. 11, 2011, Available at: http://developer.apple.com/library/ios/#documentation/IDEs/Conceptual/Xcode4TransitionGuide/Debugging/Debugging.html#//apple_ref/doc/uid/TP40009984-CH3-SW1.

* cited by examiner

*Primary Examiner* — Li B Zhen
*Assistant Examiner* — Sen Chen
(74) *Attorney, Agent, or Firm* — Kevin Sullivan; Kate Drakos; Micky Minhas (57) ABSTRACT

A debugger session is initiated to monitor application execution. A debugger canvas corresponding to the debugger session is identified and displayed. The displayed debugger canvas includes one or more code bubbles created during a prior debugger session. The one or more code bubbles already present on the displayed debugger canvas are reused during the current debugger session. Accordingly, existing code bubbles and bubble sets are reused on a debugger canvas when entering a debug session, thus providing a more stable and manageable view for debugging an application in an integrated development environment. The code fragments in code bubbles on a debugger canvas can be analyzed, inspected, and edited during or after a debug session. Notations can also be added to a debugger canvas in the form of note bubbles and context data bubbles.

18 Claims, 6 Drawing Sheets

DEBUGGING CODE VISUALLY ON A CANVAS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

During the development and testing of software, software developers can use a variety of tools. One tool frequently used by software developers is a debugger. A debugger allows a software developer to examine the execution of a computer program. However, using a debugger, or debugging, is a task that typically puts a large strain on a software developer's working memory.

Some debuggers provide a user interface to display source code files that correspond to the control flow of the computer program being debugged. Use of such "file-based" debuggers oftentimes requires that a software developer view and manage an overwhelming number of source code files and methods corresponding to program execution.

Other debuggers provide a user interface that displays a canvas and source code "bubbles" corresponding to execution of the debugged program. Such "code bubble-based" debuggers provide a visual representation of the control flow of program execution. Specifically, as methods and functions are called during program execution, corresponding code bubbles are added to the canvas. Each time the debugged program is executed, new code bubbles are added to the canvas, but displaced vertically from the code bubbles added during prior executions of the debugged program. Accordingly, use of such code bubble-based debuggers can require a software developer to view and manage a vast number of canvases and code bubbles relating to execution of a debugged program.

Unfortunately, debuggers using code bubbles typically lack the ability to reuse code bubbles already present on a debugger canvas. As a result, it can be difficult to provide software developers with a manageable way to understand and conceptualize the control flow of a debugged program. Consequently, when using existing debuggers, software developers can experience difficulties in understanding and conceptualizing the control flow of program. These difficulties are caused at least in part by the amount and/or complexity of onscreen information that software developers must interpret when debugging.

BRIEF SUMMARY

The present invention extends to methods, systems, and computer program products for debugging code visually on a canvas, including embodiments for debugging an application in an integrated development environment.

In some embodiments, a debugger session is initiated to monitor application execution. A debugger canvas corresponding to the debugger session is identified (e.g., an active or most recently created debugger canvas). The identified debugger canvas is displayed. One or more code bubbles present on the displayed debugger canvas are reused. The one or more code bubbles present on the debugger canvas having been created during a prior debugger session.

In other embodiments, a first debugger session is started to monitor application execution. One or more code bubbles are created on a debugger canvas. The one or more code bubbles correspond to application execution during the first debugger session and have first context data associated with application execution during the first debugger session. The first context data is saved for use in subsequent debugger sessions.

A second debugger session is started to monitor application execution. One or more code bubbles from the first debugger session are reused by presenting the one or more code bubbles visually on the debugger canvas. The one or more reused code bubbles correspond to application execution during the second debugger session and have second context data associated with application execution during the second debugger session. The first context data and the second context data are compared to determine differences in application execution between the first debugger session and the second debugger session.

This brief summary is provided to introduce a selection of concepts in a simplified form that are further described below in the detailed description. This brief summary is not intended to identify key features or essential features of the claimed subject matter, nor is it intended to be used as an aid in determining the scope of the claimed subject matter.

Additional features and advantages of the invention will be set forth in the detailed description which follows, and in part will be obvious from the detailed description, or may be learned by the practice of the invention. The features and advantages of the invention may be realized and obtained by means of the instruments and combinations particularly pointed out in the appended claims. These and other features of the present invention will become more fully apparent from the following detailed description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for debugging code visually on a canvas, including embodiments for debugging an application in an integrated development environment.

In some embodiments, a debugger session is initiated to monitor application execution. A debugger canvas corresponding to the debugger session is identified (e.g., an active or most recently created debugger canvas). The identified debugger canvas is displayed. One or more code bubbles present on the displayed debugger canvas are reused. The one or more code bubbles present on the debugger canvas having been created during a prior debugger session.

In other embodiments, a first debugger session is started to monitor application execution. One or more code bubbles are created on a debugger canvas. The one or more code bubbles correspond to application execution during the first debugger session and have first context data associated with application execution during the first debugger session. The first context data is saved for use in subsequent debugger sessions.

A second debugger session is started to monitor application execution. One or more code bubbles from the first debugger session are reused by presenting the one or more code bubbles visually on the debugger canvas. The one or more reused code bubbles correspond to application execution during the second debugger session and have second context data associated with application execution during the second debugger session. The first context data and the second context data are compared to determine differences in application execution between the first debugger session and the second debugger session.

Embodiments of the present invention may comprise or utilize a special-purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
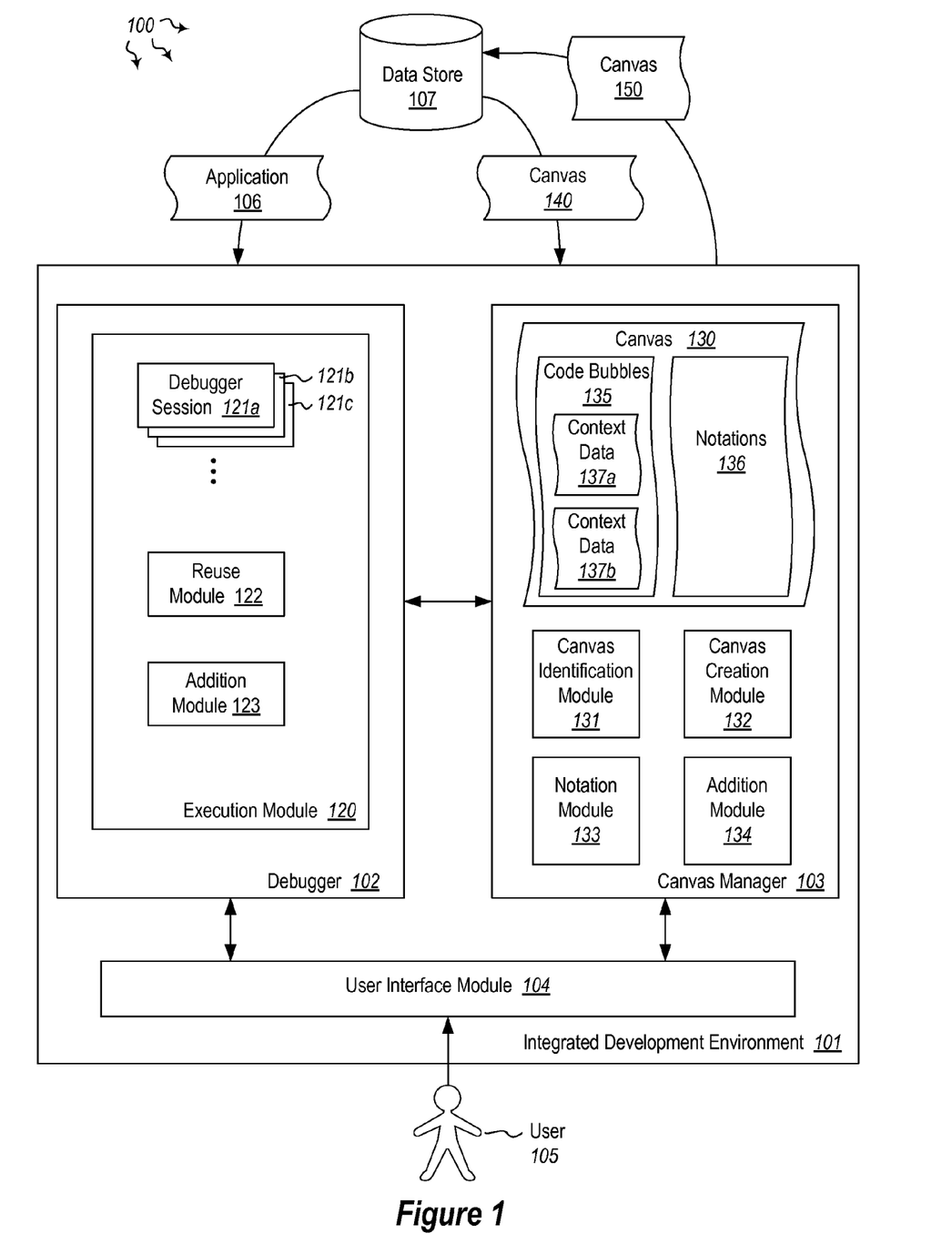
FIG. 1 illustrates an example computer architecture that facilitates debugging code visually on a canvas.

FIG. 1 illustrates an example computer architecture 100 that facilitates debugging code visually on a canvas. Referring to FIG. 1, computer architecture 100 includes integrated development environment 101. Integrated development environment 101 is a software application configured to provide comprehensive and extensive functionality to assist computer programmers, software developers, and testers in the development of software. In order to debug application 106 within integrated development environment 101, integrated development environment 101 can access application 106 from data store 107.

Integrated development environment 101 includes debugger 102, canvas manager 103, and user interface module 104, all of which can be configured to interoperate together to facilitate debugging code visually on a canvas. User 105 can interact with the component modules of integrated development environment 101, including debugger 102 and canvas manager 103, through user interface module 104. Further, integrated development environment 101 can include numerous other modules, such as, for example, a source code editor module, a compiler module, or an interpreter module.

User interface module 104 is configured to enable interaction between user 105 and integrated development environment 101. User 105 can interact with user interface module 104 to submit or select input to integrated development environment 101 and observe output from integrated development environment 101. User 105 can interact with user interface module 104 to load application 106 into integrated development environment 101 and manipulate one or more code bubbles 135 on canvas 130.

Code bubbles 135 on canvas 130 are configured to provide for the visualization of debugging sessions 121a, 121b, 121c, etc. For example, each time a method is called during execution of application 106, visualization can be accomplished by adding to canvas 130 a code bubble 135 containing the source code of the method. As application 106 executes within debugger 102, the addition or reuse of code bubbles 135 on canvas 130 forms a visual image of the code flow.

Accordingly, user 105 interacts with and uses the component modules of integrated development environment 101 through interaction with user interface module 104. User interface module 104 can provide user interface controls that correspond to and invoke functionality provided by debugger 102. For example, user interface module 104 can provide user interface controls to set breakpoints in the source code of application 106 and start the execution of application 106 within debugger 102. Once a breakpoint is encountered during execution of application 106, user interface module 104 can provide user interface controls that enable user 105 to, for example, step over, step into, or step out of source code lines of application 106, thereby assisting the user 105 in observing the control flow of the execution of application 106.

User interface module 104 can also provide user interface controls that correspond to and invoke the functionality provided by canvas manager 103. For example, user interface module 104 can provide user interface controls that enable user 105 to create a new canvas using canvas creation module 132. As another example, user interface module 104 can provide user interface controls that enable user 105 to manipulate canvas 130 by panning or zooming on canvas 130, adding, modifying or deleting code bubbles 135, or adding, modifying, or deleting notations 136.

Debugger 102 is configured to debug application 106. Debugger 102 can be, for example, a source code-level debugger, symbolic debugger, low-level debugger, or a machine-language debugger. Debugger 102 includes execution module 120. Execution module 120 is configured to execute application 106 within one or more of debugger sessions 121a, 121b, 121c, etc. Each execution of application 106 within execution module 120 can create a debugger session (e.g., debugger session 121a). If application 106 is executed more than once within execution module 120, then more than one debugger session (e.g., debugger sessions 121a, 121b, and 121c) can correspond to the execution of application 106. Each debugger session can correspond to one or more debugger canvases 130 having one or more code bubbles 135. The one or more code bubbles 135 can correspond to the control flow of the execution of application 106.

Execution module 120 includes reuse module 122 and addition module 123. Reuse module 122 is configured to determine whether code bubbles 135 present on canvas 130 can be reused by a current debugger session 121. During current debugger session 121, application 106 is executed within execution module 102. During the execution of application 106, one or more methods or functions can be invoked or called. If canvas 130 corresponds to a current debugger session 121, then reuse module 122 determines whether one or more code bubbles 135 on canvas 130 correspond to the one or more methods or functions that have been invoked or called.

If code bubbles 135 correspond, then reuse module 122 reuses those code bubbles on canvas 130. On the other hand, if code bubbles 135 do not correspond, then addition module 123 can be used to add new code bubbles to canvas 130. Addition module 123 is configured to add code bubbles to canvas 130 when execution of application 106 invokes or calls methods or functions that do not already have corresponding code bubbles 135 on canvas 130.

Canvas manager 103 is configured to manage one or more debugger canvases 130 which may be open in integrated development environment 101. Canvas manager 103 can include one or more canvases 130.

Canvas 130 can include one or more code bubbles 135 corresponding to the execution of application 106 during a debugger session 121. Code bubble 135 can include one or more lines of code, code fragments, entire methods or functions, or entire program code files. Code bubble 135 can contain context data 137a/137b. Context data 137a/137b can include data representative of visual indicators of execution flow or execution data, including but not limited to, the values of variables during execution of the code in code bubble 135.

Context data 137a can be created during execution of code bubble 135 in a first debugger session (e.g., debugger sessions 121a). Context data 137b can be created during execution of code bubble 135 in a second debugger session (e.g., debugger session 121b) that is subsequent to the first debugger session. Accordingly, context data 137a and 137b can be compared to determine differences in execution of code bubble 135. Further, canvas 130 can also include notations 136.

Canvas manager 103 includes canvas identification module 131, canvas creation module 132, notation module 133, and addition module 134. Canvas identification module 131 is configured to identify the open canvas 130 that corresponds to the current debugger session 121 and provide that canvas to user interface module 104 for display. If no corresponding canvas is open, then canvas identification module 131 interoperates with canvas creation module 132 to create a canvas 130.

The created canvas 130 can correspond to the current debugger session 121. Canvas creation module 132 is configured to create and open a new canvas which corresponds to the current debugger session 121, when no other open canvas corresponds. Canvas creation module 132 creates a new canvas 130 and provides that canvas to user interface module 104 for display.

Notation module 133 is configured to add, modify, delete, or otherwise manage notations 136 on an open canvas 130. User 105 can interact with notation module 133 and notations 136 through interaction with user interface module 104. Addition module 134 is configured to manually add code bubbles 135 to canvas 130. User 105 can interact with addition module 134 through interaction with user interface module 104.

Data store 107 can persistently store application 106 and canvas 130. Data store 107 can include a computer storage media (devices). Integrated development environment 101 can load or open application 106 from data store 107. Integrated development environment can load or open as canvas 130 any persistently saved canvas 140 from data store 107.

Integrated development environment can persistently save as canvas 150 any canvas 130 open in canvas manager 103. Canvases 140 and 150 can contain code bubbles 135, context data 137a/137b, and notations 136, as shown in canvas 130.

Each of the components of integrated development environment 101 can communicate and interoperate with any one or more of the other components of integrated development environment 101. For example, debugger 102 can provide data to user interface module 104 in order that user interface module 104 can display that data to user 105. Similarly, user interface module 104 can invoke the functionality provided by debugger 102. As another example, debugger 102 can provide data to, or invoke the functionality of, canvas manager 103 and canvas manager 103 can provide data to, or invoke the functionality of, debugger 102. Likewise, canvas manager 103 can provide data to user interface module 104 in order that user interface module 104 can display that data to user 105 and user interface module 104 can invoke the functionality provided by canvas manager 103.

Figure 2:
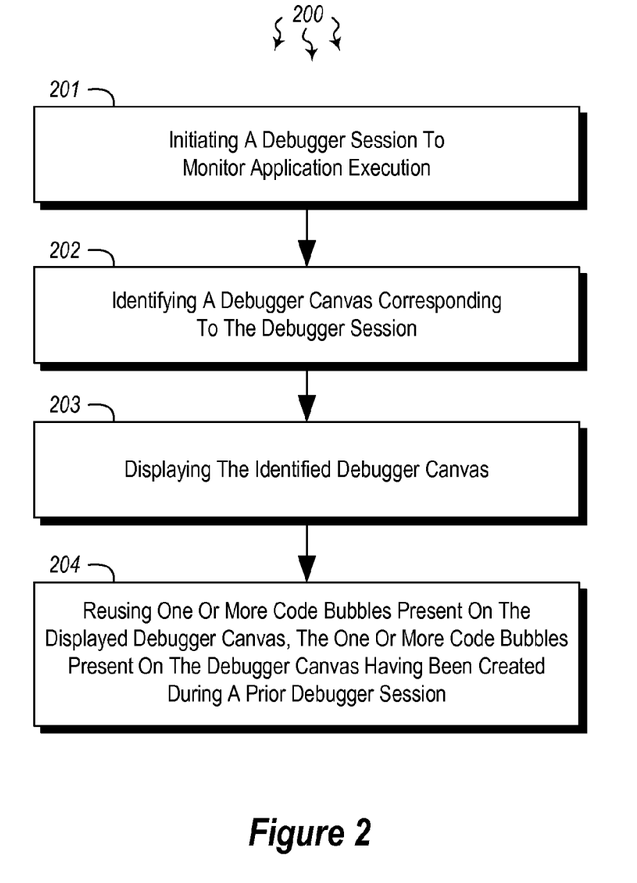
FIG. 2 illustrates a flow chart of an example method for debugging code visually on a canvas.

FIG. 2 illustrates a flow chart of an example method 200 for debugging code visually on a canvas. Method 200 will be described with respect to the components and data of computer architecture 100.

Method 200 includes an act of initiating a debugger session to monitor application execution (act 201). For example, debugger session 121a can be automatically initiated to monitor the execution of application 106. As another example, user 105 can interact with user interface module 104 to initiate debugger session 121a to monitor the execution of application 106. Further, in some embodiments, user 105 can interact with user interface module 104 to initiate debugger session 121a by selecting a user interface control.

In other embodiments, integrated development environment 101 can initiate debugger session 121a by inspecting a recorded execution trace. A recorded execution trace can include a record of some or all of the methods and functions called during execution of application 106. A recorded execution trace can also include data, such as context data, corresponding to some or all of the methods and functions called during execution of application 106. For example, a user 105 can use integrated development environment 101 to execute application 106 and generate a recorded execution trace. User 105 can inspect portions of the recorded execution trace by creating or adding code bubbles 135 to canvas 130.

In some embodiments, creating or adding code bubbles 135 to canvas 130 can be accomplished by dragging and dropping onto canvas 130 portions of a tree view of the recorded execution trace as it is displayed to user 105. Accordingly, the execution of application 106 and the use of canvas 130 can be dependent acts or independent acts. For example, a first user 105 at a first computer system can execute application 106 in order to generate the recorded execution trace and a second user 105 at a second computer system can inspect the recorded execution trace in a debugger canvas 130.

Method 200 includes an act of identifying a debugger canvas corresponding to the debugger session (act 202). For example, canvas identification module 131 can identify a debugger canvas 130 corresponding to debugger session 121a. In some embodiments, canvas identification module 131 can identify a debugger canvas 130 by identifying a canvas that is active. In other embodiments, canvas identification module 131 can identify a debugger canvas 130 by identifying a canvas that is most recently created. In additional embodiments, canvas identification module 131 can identify a debugger canvas 130 by identifying a canvas that is most recently used. In further embodiments, canvas identification module can identify a debugger canvas 130 by creating canvas 130 using canvas creation module 132.

Method 200 includes an act of displaying the identified debugger canvas (act 203). For example, user interface module 104 can display the identified debugger canvas 130. In some embodiments, user interface module 104 can display the identified debugger canvas 130 by receiving canvas 130 from either canvas identification module 131 or canvas creation module 132. In other embodiments, a display device can display the identified debugger canvas 130.

Method 200 includes an act of reusing one or more code bubbles present on the displayed debugger canvas, the one or more code bubbles present on the debugger canvas having been created during a prior debugger session (act 204). For example, reuse module 122 can reuse one or more code bubbles 135 present on the displayed debugger canvas 130. The one or more code bubbles 135 present on the debugger canvas 130 having been created during a prior debugger session.

Some embodiments can include an act of creating the debugger canvas if one or more debugger canvases are not already present. For example, canvas creation module 132 can create the debugger canvas 130 if one or more debugger canvases 130 are not already present. Canvas creation module 132 can create debugger canvas 130 automatically or in response to interaction by the user 105 with user interface module 104.

Some embodiments can also include an act of checking that the one or more code bubbles present on the debugger canvas correspond to code fragments executing during the debugger session. For example, reuse module 122 can check that the one or more code bubbles 135 present on the debugger canvas 130 correspond to code fragments executing during debugger session 121a.

Further embodiments can include an act of adding one or more code bubbles to the debugger canvas which correspond to code fragments executing during the debugger session. As an example, addition module 123 can add one or more code bubbles 135 to the debugger canvas 130. The one or more code bubbles 135 correspond to code fragments executing during debugger session 121a.

Additional embodiments can include the act of saving the debugger canvas for subsequent use. For example, integrated development environment 101 can save debugger canvas 130 for subsequent use. More specifically, debugger canvas 130 can be saved to data store 107 as canvas 150. Saving debugger canvas 130 as canvas 150 can include, for example, saving the one or more code bubbles 135 present on debugger canvas 130, saving context data 137a/137b associated with the one or more code bubbles 135 present on the debugger canvas 130, or saving the debugger canvas 130 for use in a subsequent integrated development environment session. A saved debugger canvas 150 can be accessed in a variety of ways by a variety of entities. For example, a different computer system 100, integrated development environment 101, or user 105 can access saved debugger canvas 150.

Other embodiments can include an act of providing notations on the debugger canvas, wherein the notations provide information regarding at least one of the one or more code bubbles, the debugger canvas, or the debugger session. For example, notation module 133 can, automatically or in response to interaction by user 105 with user interface module 104, provide notations 136 on the debugger canvas 130. The notations 136 can provide information regarding at least one of the one or more code bubbles 135, the debugger canvas 130, or debugger session 121a.

Some embodiments can also include an act of adding one or more code bubbles to the debugger canvas which do not correspond to application execution during the debugger session. For example, addition module 134 can, automatically or in response to interaction by user 105 with user interface module 104, add one or more code bubbles 135 to the debugger canvas 130 which do not correspond to execution of application 106 during debugger session 121*a*.

Figure 3:
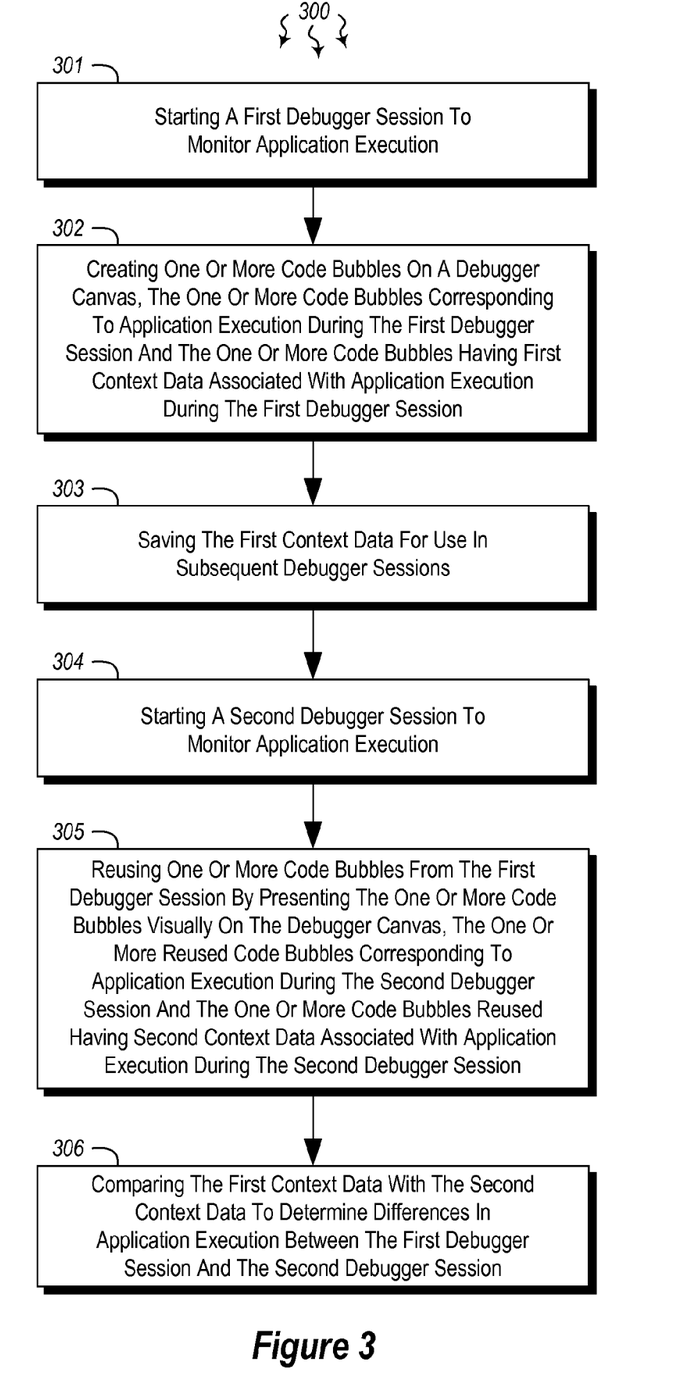
FIG. 3 illustrates a flow chart of another example method for debugging code visually on a canvas.

FIG. 3 illustrates a flow chart of another example method 300 for debugging code visually on a canvas. Method 300 will be described with respect to the components and data of computer architecture 100.

Method 300 includes an act of starting a first debugger session to monitor application execution (act 301). For example, debugger session 121*a* can be automatically started to monitor the execution of application 106. As another example, user 105 can interact with user interface module 104 to start debugger session 121*a* to monitor the execution of application 106. Further, user 105 can interact with user interface module 104 to start debugger session 121*a* by selecting a user interface control.

Method 300 includes an act of creating one or more code bubbles on a debugger canvas, the one or more code bubbles corresponding to application execution during the first debugger session and the one or more code bubbles having first context data associated with application execution during the first debugger session (act 302). For example, addition module 123 can create one or more code bubbles 135 on a debugger canvas 130. The one or more code bubbles 135 can correspond to the execution of application 106 during debugger session 121*a* and have context data 137*a*. Context data 137*a* can be associated with execution of application 106 during the first debugger session 121*a*. As another example, addition module 134 can be used by user 105 to manually create one or more code bubbles 135 on a debugger canvas 130. The one or more code bubbles 135 correspond to the execution of application 106 during first debugger session 121*a* and have context data 137*a*.

Method 300 includes an act of saving the first context data for use in subsequent debugger sessions (act 303). For example, integrated development environment 101 can save context data 137*a* for use in subsequent debugger sessions. In some embodiments, integrated development environment 101 can save context data 137*a* by saving to data store 107 the entire debugger canvas 130 on which context data 137*a* is present. In other embodiments, integrated development environment 101 can save context data 137*a* by saving to data store 107 context data 137*a* without at least some other parts of debugger canvas 130.

Method 300 includes an act of starting a second debugger session to monitor application execution (act 304). For example, a second debugger session 121*b* can be automatically started to monitor the execution of application 106. As another example, user 105 can interact with user interface module 104 to start debugger session 121*b* to monitor the execution of application 106. Further, user 105 can interact with user interface module 104 to start debugger session 121*b* by selecting a user interface control.

Method 300 includes an act of reusing one or more code bubbles from the first debugger session by presenting the one or more code bubbles visually on the debugger canvas, the one or more reused code bubbles corresponding to application execution during the second debugger session and the one or more reused code bubbles having second context data associated with application execution during the second debugger session (act 305). For example, reuse module 122 can reuse one or more code of bubbles 135 by presenting the one or more of code bubbles 135 on debugger canvas 130. The one or more reused code bubbles can correspond to the execution of application 106 during debugger session 121*b* and have context data 137*b*. Context data 137*b* is associated with the execution of application 106 during debugger session 121*b*.

Method 300 includes an act of comparing the first context data with the second context data to determine differences in application execution between the first debugger session and the second debugger session (act 306). For example, integrated development environment 101 can compare context data 137*a* with context data 137*b* to determine differences in the execution of application 106 between debugger session 121*a* and debugger session 121*b*. In another example, canvas manager 103 can compare context data 137*a* with context data 137*b* to determine differences in the execution of application 106 between debugger session 121*a* and debugger session 121*b*. In yet another example, user 105 can compare context data 137*a* with context data 137*b* to determine differences in the execution of application 106 between debugger session 121*a* and debugger session 121*b*.

In some embodiments, a second debugger session occurs subsequent to the first debugger session. For example, debugger session 121*b* can be subsequent to debugger session 121*a*.

In some embodiments, a second debugger session occurs on a different computer system. For example, debugger session 121*b* can occur on a different computer system from debugger session 121*a*.

Figure 4A:
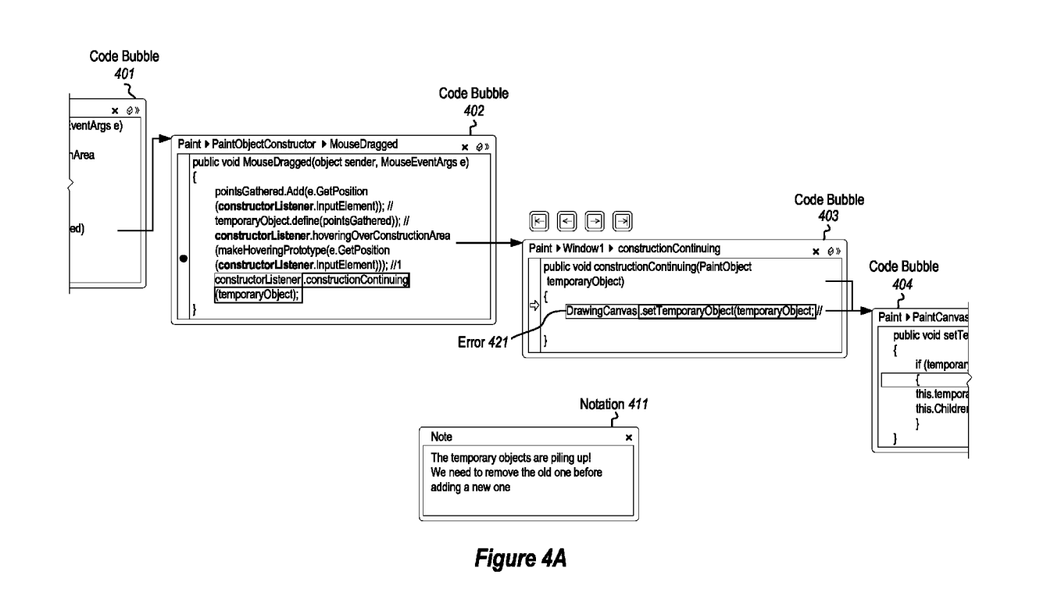
FIGS. 4A-4C illustrate user interface screens of an example user interface that facilitates debugging code visually on a canvas.
Figure 4B:
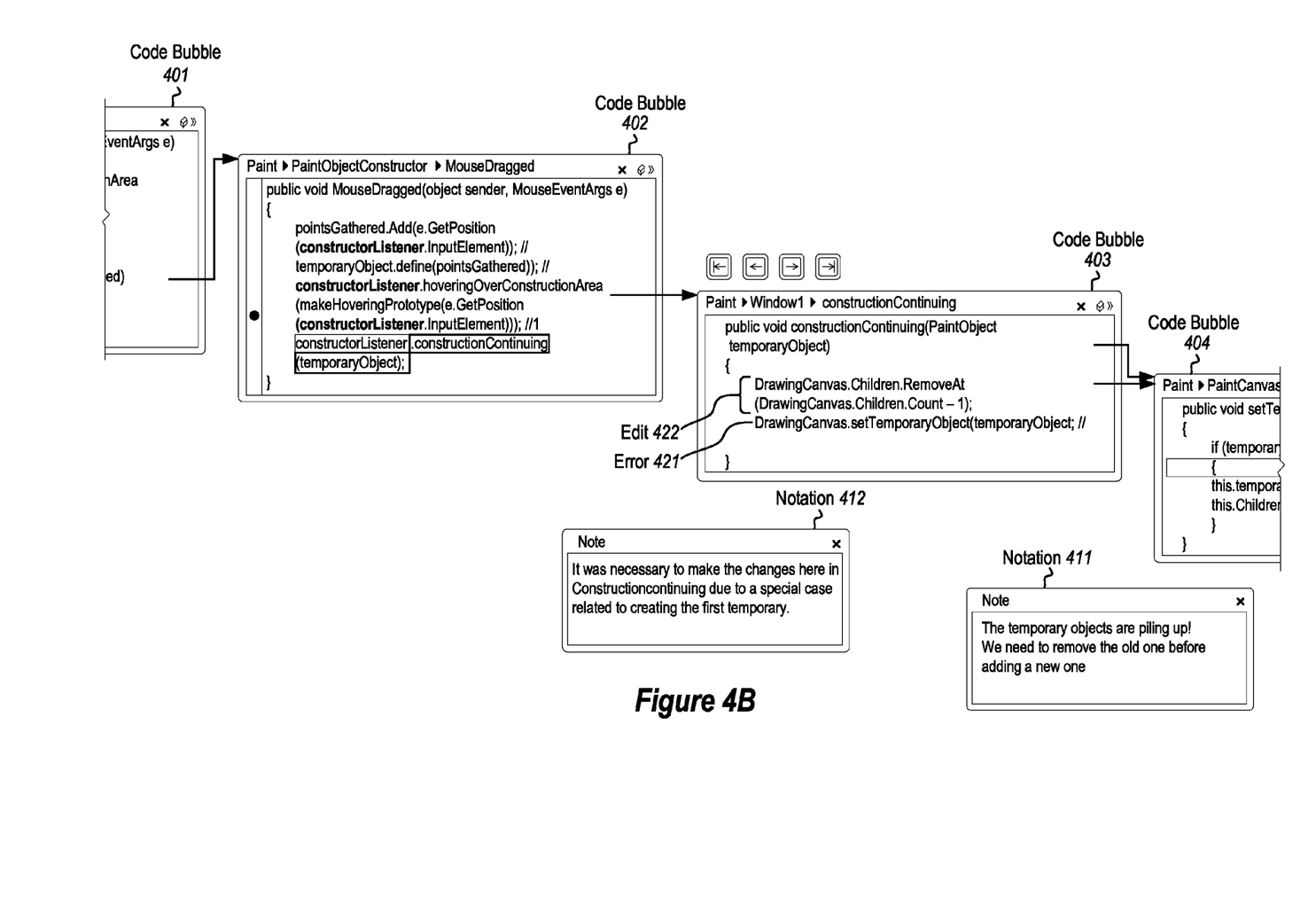
Figure 4C:
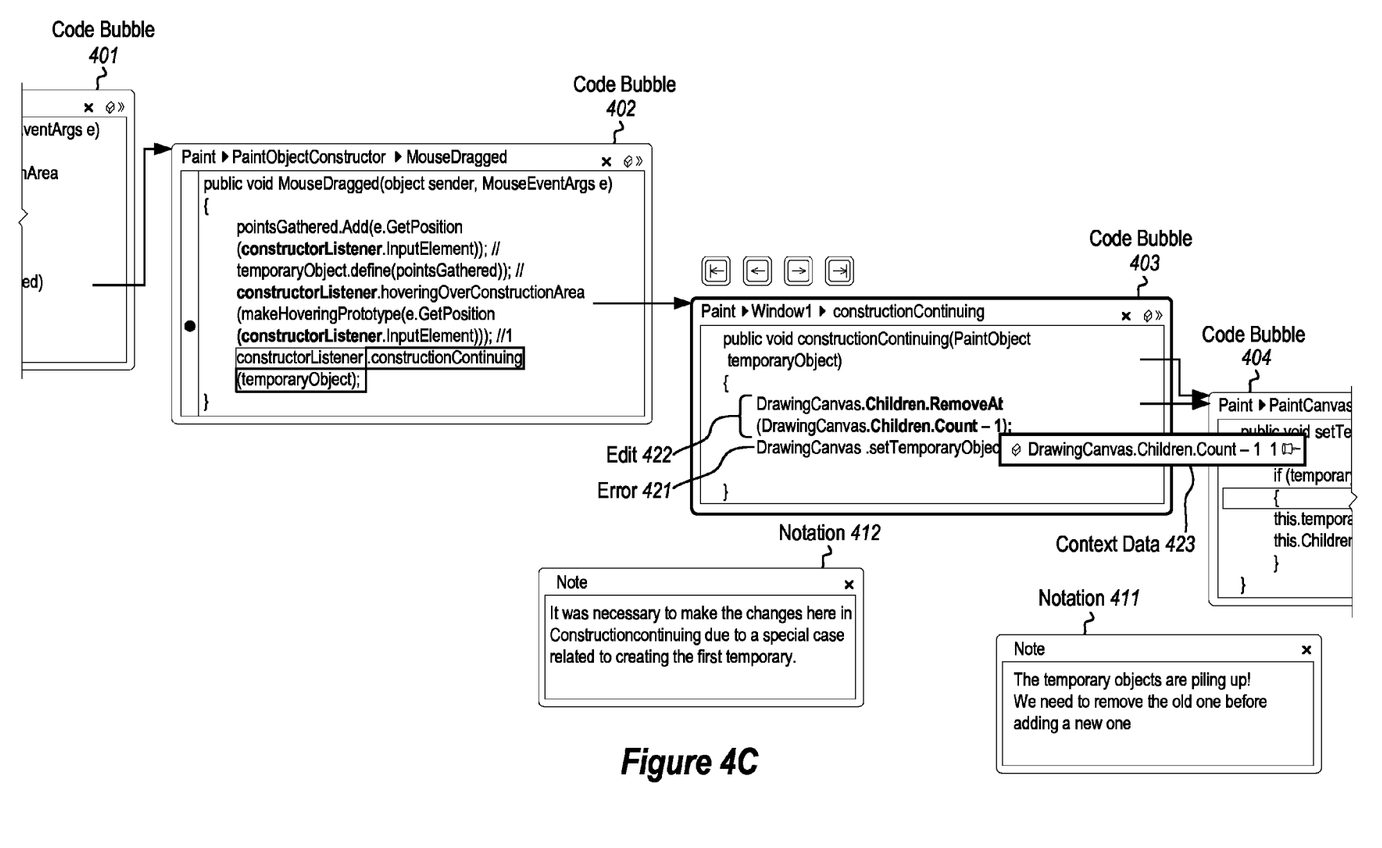

FIGS. 4A-4C illustrate user interface screens of an example user interface that facilitates debugging code visually on a canvas. FIGS. 4A-4C show a debugger canvas having code bubbles 401-404 and a notation 411 concerning an error 421 in code bubble 403. Code bubbles 401-404 are a chain of methods that have been invoked. The execution of code bubble 401 has invoked the execution of code bubble 402, code bubble 402 has in turn invoked the execution of code bubble 403, which has invoked the execution of code bubble 404.

In FIG. 4A, during a first debugger session, a user adds notation 411 regarding an error 421 identified in code bubble 403.

In FIG. 4B, in an attempt to correct error 421, a user makes an edit 422 to the source code of code bubble 403 and adds a corresponding notation 412.

In FIG. 4C, during a second debugger session, a user inspects the context data 423 of code bubble 403 to determine if edit 422 fixed the error 421.

Some or all of the embodiments described above can be combined to debug code visually on a canvas. Alternatively, some or all of the embodiments described above can be used individually to debug code visually on a canvas.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including one or more processors and memory, a computer-implemented method for debugging an application in an integrated development environment, the method comprising:
an act of initiating a debugger session to monitor application execution;

an act of identifying a debugger canvas corresponding to the debugger session;

an act of displaying the identified debugger canvas;

an act of detecting one or more methods or functions that have been invoked or called by the debugger session;

determining whether the one or more code bubbles on the debugger canvas correspond specifically to the one or more methods or functions that have been invoked or called; and an act of reusing one or more code bubbles currently present on the displayed debugger canvas which include source code for the one or more methods or functions that have been invoked and only after first determining that the one or more code bubbles currently on the debugger canvas correspond to the one or more methods or functions that have been invoked or called, the one or more code bubbles present on the debugger canvas having been created during a prior debugger session, the one or more reused code bubbles including context information related to execution of the one or more methods or functions which was added to the one or more code bubbles during the prior debugger session.

2. The method of claim 1, wherein the act of initiating the debugger session comprises an act of selecting a user interface control.

3. The method of claim 1, wherein the act of initiating the debugger session comprises an act of inspecting a recorded execution trace.

4. The method of claim 1, further comprising an act of creating the debugger canvas if one or more debugger canvases are not already present.

5. The method of claim 1, wherein the act of identifying the debugger canvas comprises an act of identifying a debugger canvas that is active.

6. The method of claim 1, wherein the act of identifying the debugger canvas comprises an act of identifying a debugger canvas that was most recently created.

7. The method of claim 1, further comprising an act of adding one or more code bubbles to the debugger canvas which correspond to code fragments executing during the debugger session.

8. The method of claim 1, further comprising an act of saving the debugger canvas for subsequent use.

9. The method of claim 8, wherein the act of saving the debugger canvas for subsequent use comprises an act of saving the one or more code bubbles present on the debugger canvas.

10. The method of claim 8, wherein the act of saving the debugger canvas for subsequent use comprises an act of saving context data associated with the one or more code bubbles present on the debugger canvas.

11. The method of claim 10, wherein the context data is comprised of at least one of visual indicators of execution flow or execution data.

12. The method of claim 8 wherein the act of saving the debugger canvas for subsequent use comprises an act of saving the debugger canvas for use in a subsequent integrated development environment session.

13. The method of claim 8, further comprising an act of a different computer system accessing the saved debugger canvas.

14. The method of claim 1, further comprising an act of providing notations on the debugger canvas, wherein the notations provide information regarding at least one of the one or more code bubbles, the debugger canvas, or the debugger session.

15. The method of claim 1, further comprising an act of adding one or more code bubbles to the debugger canvas which do not correspond to application execution during the debugger session.

16. A computer program product for use at a computer system, the computer system including a display device, the computer program product for implementing a method for debugging an application in an integrated development environment, the computer program product comprising one or more computer storage devices having stored thereon computer-executable instructions that, when executed by a processor, cause the computer system to perform the following:

an act of initiating a debugger session to monitor application execution;

an act of identifying a debugger canvas corresponding to the debugger session;

an act of displaying the identified debugger canvas;

an act of detecting one or more methods or functions that have been invoked or called by the debugger session;

determining whether the one or more code bubbles on the debugger canvas correspond specifically to the one or more methods or functions that have been invoked or called; and an act of reusing one or more code bubbles currently present on the displayed debugger canvas which include source code for the one or more methods or functions that have been invoked and only after first determining that the one or more code bubbles currently on the debugger canvas correspond to the one or more methods or functions that have been invoked or called, the one or more code bubbles present on the debugger canvas having been created during a prior debugger session, the one or more reused code bubbles including context information related to execution of the one or more methods or functions which was added to the one or more code bubbles during the prior debugger session.

17. A computing system comprising:

at least one processor; and one or more storage device having stored computer-executable instructions which, when executed by the at least one processor, implement a method for debugging an application in an integrated development environment, wherein the method includes:

an act of initiating a debugger session to monitor application execution;

an act of identifying a debugger canvas corresponding to the debugger session;

an act of displaying the identified debugger canvas;

an act of detecting one or more methods or functions that have been invoked or called by the debugger session;

determining whether the one or more code bubbles on the debugger canvas correspond specifically to the one or more methods or functions that have been invoked or called; and an act of reusing one or more code bubbles currently present on the displayed debugger canvas which include source code for the one or more methods or functions that have been invoked and only after first determining that the one or more code bubbles currently on the debugger canvas correspond to the one or more methods or functions that have been invoked or called, the one or more code bubbles present on the debugger canvas having been created during a prior debugger session, the one or more reused code bubbles including context information related to execution of the one or more methods or functions which was added to the one or more code bubbles during the prior debugger session.

18. The computing system of claim 17, wherein the context information is presented proximate additional new context information added during the debugger session.

\* \* \* \* \*